United States Patent
Thornberg

(10) Patent No.: US 12,197,788 B2
(45) Date of Patent: Jan. 14, 2025

(54) POST-COMPRESSION RESIDUAL DATA OBJECT PROCESSING

(71) Applicant: Chicago Mercantile Exchange Inc., Chicago, IL (US)

(72) Inventor: Carl Erik Thornberg, Stockholm (SE)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

(21) Appl. No.: 18/212,912

(22) Filed: Jun. 22, 2023

(65) Prior Publication Data

US 2023/0350608 A1    Nov. 2, 2023

Related U.S. Application Data

(63) Continuation of application No. 17/550,974, filed on Dec. 14, 2021, now Pat. No. 11,726,720, which is a continuation of application No. 16/803,179, filed on Feb. 27, 2020, now Pat. No. 11,231,884.

(51) Int. Cl.
  G06F 3/06    (2006.01)
  G06Q 40/02   (2023.01)

(52) U.S. Cl.
  CPC .......... G06F 3/0661 (2013.01); G06F 3/0608 (2013.01); G06F 3/0619 (2013.01); G06F 3/0673 (2013.01); G06Q 40/02 (2013.01)

(58) Field of Classification Search
  CPC .... G06F 3/0661; G06F 3/0608; G06F 3/0619; G06F 3/0673; G06Q 40/02
  See application file for complete search history.

(56) References Cited

U.S. PATENT DOCUMENTS

| | | | |
|---|---|---|---|
| 8,494,953 B1 | 7/2013 | Boberski | |
| 8,533,101 B2 | 9/2013 | Cheung | |
| 11,231,884 B1 * | 1/2022 | Thornberg | G06F 3/0619 |
| 11,726,720 B2 * | 8/2023 | Thornberg | G06F 3/0619 |
| | | | 711/154 |
| 2003/0083978 A1 | 5/2003 | Brouwer | |
| 2005/0256799 A1 | 11/2005 | Warsaw | |
| 2010/0241551 A1 | 9/2010 | Brouwer | |
| 2010/0325030 A1 | 12/2010 | Brouwer | |
| 2011/0179232 A1 | 7/2011 | Schindler | |
| 2011/0276460 A1 | 11/2011 | Brouwer | |
| 2011/0276461 A1 | 11/2011 | Brouwer | |
| 2012/0023002 A1 | 1/2012 | Brouwer | |
| 2012/0023003 A1 | 1/2012 | Brouwer | |

(Continued)

OTHER PUBLICATIONS

"Interest Rate Swaps Compression: A Progress Report", ISDA Study, Feb. 2012, 9 pages.

*Primary Examiner* — Hiep T Nguyen
(74) *Attorney, Agent, or Firm* — Lempia Summerfield Katz, LLC

(57) ABSTRACT

A system includes a logic that generates a reduced-precision primary data object and an associated residual data object for each of a plurality of uncompressed data objects. The logic classifies the at least some of the generated residual data objects for removal based on data integrity rules and determines that removal of others of the generated residual data objects violates the data integrity rules. The logic removes the at least some of the generated residual data objects classified for removal and applies a corresponding adjustment to at least one of the generated residual data objects.

20 Claims, 8 Drawing Sheets

(56) References Cited

U.S. PATENT DOCUMENTS

| | | |
|---|---|---|
| 2012/0131029 A1 | 5/2012 | Laine |
| 2012/0303509 A1 | 11/2012 | Brouwer |
| 2012/0320974 A1 | 12/2012 | Li et al. |
| 2015/0262305 A1 | 9/2015 | Bawadhankar |
| 2017/0280161 A1 | 9/2017 | Cai et al. |
| 2019/0036543 A1 | 1/2019 | Smith |
| 2020/0280565 A1 | 9/2020 | Rogynskyy et al. |
| 2020/0293523 A1 | 9/2020 | Eike et al. |

* cited by examiner

POST-COMPRESSION RESIDUAL DATA OBJECT PROCESSING

CROSS-REFERENCE TO RELATED APPLICATIONS

This application is a continuation of and claims priority to U.S. patent application Ser. No. 17/550,974, filed Dec. 14, 2021, issuing as U.S. Pat. No. 11,726,720, which is a continuation of and claims priority to U.S. patent application Ser. No. 16/803,179, filed Feb. 27, 2020, now U.S. Pat. No. 11,231,884, the entire disclosures of which are hereby incorporated by reference and relied upon.

BACKGROUND

While costs associated with computers and memory storage products have been falling with technological improvements, available computing resources remain at a premium. For example, the processing of electronic communications has led to substantial increases in necessary memory usage and computing processing power. In many cases, computing centers tasked with implementing and maintaining these electronic communications are constrained by existing or aging hardware and software resources, and budgetary concerns regarding the purchase, upgrade, or repair of the hardware and software infrastructure components.

With the ever-increasing amount of data being processed, computing resources, such as memory and/or other storage, may be depleted and additional resources may need to be added to the system. Additionally, the data stored may be communicated between computing systems for processing. These communication requirements may result in slowed communications capability, as communication bandwidth on an organization's network may be a finite, limited resource.

For these and other reasons, improvements to data management capabilities, including intelligent compression of data, are warranted. The compression should be intelligent in the sense that the compression only removes data that is redundant or otherwise indicative of unnecessary information. In that way, data indicative of information of value is maintained despite the data compression.

Data compression procedures have been configured to generate data objects through netting or other offsetting. A new data object is accordingly generated. Unfortunately, a magnitude or other parameter of the new data object often runs afoul of one or more restrictions on decimal places. Mere rounding the parameter of the new data object to comply with the restriction(s) on decimal places may introduce undesirably significant error.

DETAILED DESCRIPTION

Figure 1:
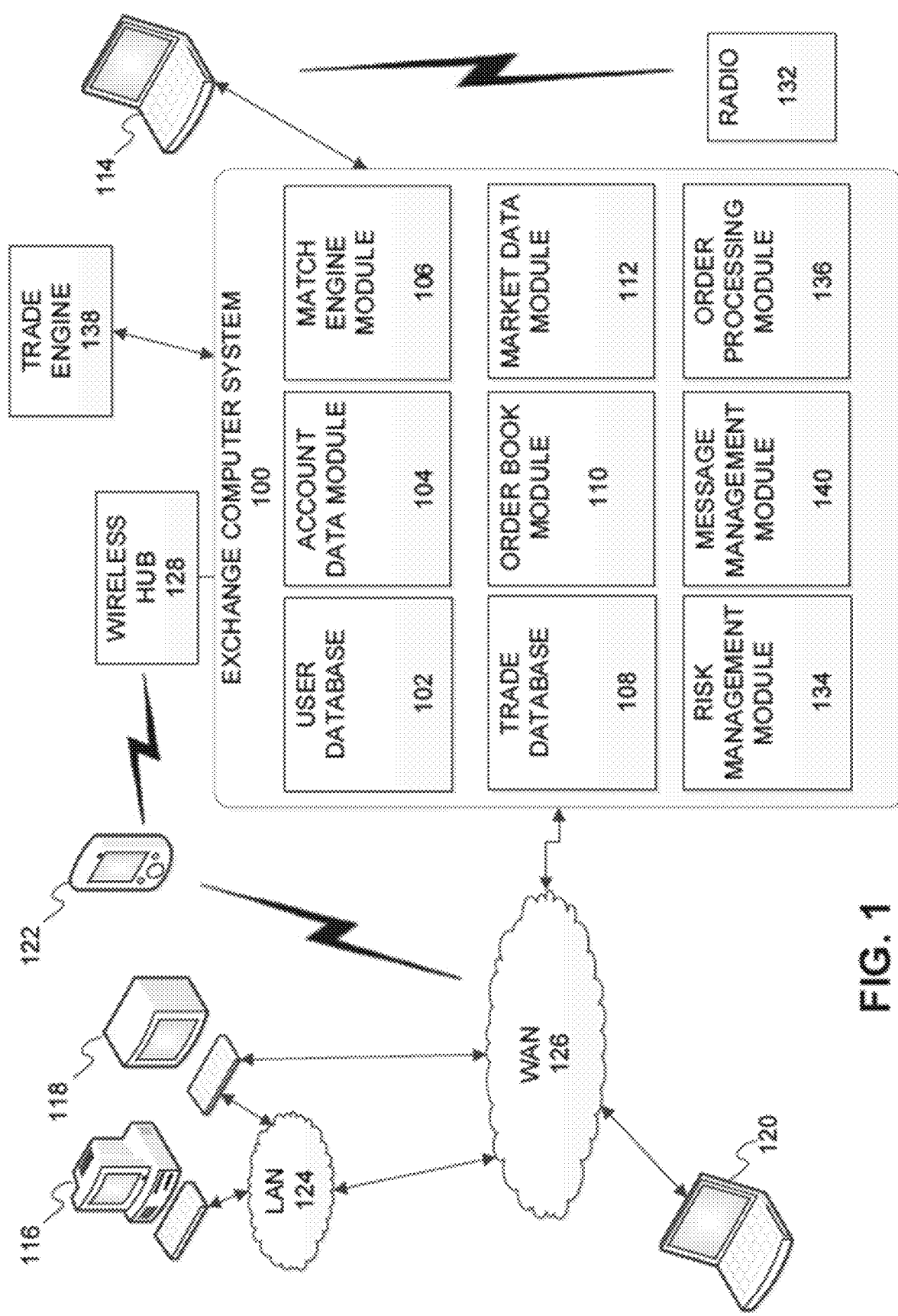
FIG. 1 depicts an illustrative computer network system that may be used to implement aspects of the disclosed embodiments.

Methods and systems of processing a set of primary data objects and a set of residual data objects are described. The primary and residual data objects are associated with one another in connection with rounding of a set of data objects (i.e., unrounded data objects) generated via a data compression or other data processing procedure. Each residual data object is paired or otherwise associated with a respective one of the primary data objects. The residual data object is representative of a rounding that led to the associated primary data object. For example, each pairing of associated residual and primary data objects may be added to, or otherwise combined with, one another to reach one of the unrounded data objects.

The data compression procedure may be generally directed to reducing the number of data objects in an initial set of data objects. For example, the data compression procedure may generate the unrounded data objects after netting or otherwise combining two or more of the initial set of data objects. Unfortunately, as described above, the output of such combinations may run afoul of a restriction on decimal places, and mere rounding introduces undesirable levels of error. One approach to addressing the error involves creation of another data object, such that the sum of the two new data objects results in the desired magnitude. But adding another data object decreases or undermines the effectiveness of the compression procedure.

The disclosed methods and systems are directed to providing a way to address the rounding error while minimizing or avoiding the addition of further data objects—i.e., residual data objects. The data objects that are generated or otherwise presented as a result of the data compression procedure and subsequent rounding are then processed by the disclosed methods and systems in an effort to remove the residual data objects. The disclosed methods and systems may implement an optimization procedure to optimize the removal of the residual data objects, as described below.

These and other aspects of the disclosed methods and systems present technical solutions to the technical problems presented by the processing of sets of data objects. For instance, one technical problem involves data object sets that are excessively large. The size of the data object set presents storage and other processing requirements and challenges. However, indiscriminate deletion of data objects to reduce the size of the data object set is not possible, insofar as information will be lost. Therefore, the technical problem also involves finding an intelligent way to reduce the size of the data object set. The disclosed methods and system provide an intelligent procedure for reducing the size (and/or other size-related parameters) of the data object set to provide solutions to such storage and processing challenges without incurring detrimental information loss. Yet another technical benefit provided by the disclosed methods and systems involves a reduction in communications or other data transmissions regarding the new data objects to be incorporated into a data object set.

The disclosed methods and systems may be implemented in connection with coupon blending and other types of risk neutral compression procedures involving data object sets representative of financial positions. Each financial position is created by a trade or transaction, such as an interest rate swap. In the case of interest rate and other swap trades, each trade may create two positions, or legs, e.g., a "receive" position and a "pay" position for the incoming and outgoing cash flows, respectively. Coupon blending involves a single party (e.g., a bank) attempting to lower the size of a portfolio while remaining cash flow neutral. The cash flows thus remain the same, but the gross notional amount of funds involved in the positions of the portfolio is lowered, as described in the examples below. The disclosed methods and systems are also useful in compression scenarios involving multiple parties. So-called multilateral compression involves compressing the portfolios of more than one party in accordance with risk constraints specified by each party. The risk constraints specify the degree to which the party's cash flows and/or other risk parameters (e.g., bucketed interest, delta, etc.) may deviate from a cash flow neutral adjustment. The multilateral compression is usually provided in a manner that is risk neutral for a central or other controlling party, such as a clearinghouse (e.g., central counterparty clearinghouse, or CCP) or exchange. Keeping the CCP risk neutral is thus another constraint on the optimization implemented by the disclosed methods and systems.

The disclosed methods and systems may also be implemented in connection with compression procedures that implement a refactoring of the set of data objects. Refactoring generally adds new data objects and, thus, degrees of freedom, to the optimization that finds the optimal compression or other adjustments. For example, in some financial applications, the refactoring may be used to create and value new trades based on segments or other components of the existing trades.

When performing coupon blending in a CCP or a multi-lateral compression with a risk-free netting component against a CCP, a new net portfolio is represented with a new set of trades with an optimal amount of gross notional to reduce capital charges. Another objective for such procedures is to reduce the number of line items, e.g., to keep the portfolio of both the CCP and the clients small, which in turn reduces the number of records needed to be stored and reduces the processing needed to be performed in the future, for the same net position. For example, reducing the number of records leads to faster initial margin and other calculations in the CCP.

One inherent problem of recreating a portfolio with new net positions is that there is a restriction on the number of decimals, e.g., six for a rate described as percentage, that can be used for the fixed rate of a swap. When rounding a fixed rate to represent the net position, a large rounding error may be introduced even for relatively small trades. To address this problem, two trades are used. The two trades have different, but valid and rounded, rates, as well as different notional amounts. The sum of the two trades is equal to the net fixed and float positions of the original unrounded trade. The drawback to this approach is that two trades are needed instead of one.

The disclosed methods and systems address this drawback by selecting two trades—a primary trade and a residual trade, and then implementing an optimization that nets rounding effects against different accounts in the CCP or the clients of a multi-lateral compression. In this manner, the disclosed methods and systems optimize the number of line items used to represent the portfolios. In some cases (e.g., multi-lateral compression scenarios), the disclosed methods and systems may also reduce the number of revisions produced by the original compression service, which reduces the transaction processing for clients to implement the compression with the CCP. In still other cases, an original portfolio is broken down into the common constituent legs for use as components in a trade refactoring procedure. The disclosed methods and systems may be useful in such cases, as the trade refactoring may create many new trades during a total refactoring of a portfolio.

The disclosed methods and systems that the parties holding the portfolios are not sensitive to very small fluctuations in the portfolio against the CCP. The main concern is the maintenance of market risk in larger terms. Such parties are thus not concerned with small movements of notional per trade or small movements of cash flow amounts per pay date.

The disclosed methods and systems may be used in financial applications other than coupon blending and multilateral compression. For instance, the disclosed methods and systems are not limited to risk-free netting compression involving a single party.

A financial instrument trading system, such as a futures exchange, referred to herein also as an "exchange", such as the Chicago Mercantile Exchange Inc. (CME), provides a contract market where financial instruments, for example futures and options on futures, are traded. The term "futures" is used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time.

Typically, the exchange provides for a centralized "clearinghouse" through which all trades made must be confirmed, matched, and settled each day until offset or delivered. The clearinghouse is an adjunct to the exchange, and may be an operating division of the exchange, which is responsible for settling trading accounts, clearing trades, collecting and maintaining performance bond funds, regulating delivery, and reporting trading data. One role of the clearinghouse is to mitigate credit risk. Clearing is the procedure through which the clearinghouse becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearinghouse.

An interest rate futures contract, also referred to as an interest rate future, is a futures contract having an underlying instrument/asset that pays interest, for which the parties to the contract are a buyer and a seller agreeing to the future delivery of the interest bearing asset, or a contractually specified substitute. Such a futures contract permits a buyer and seller to lock in the price, or in more general terms the interest rate exposure, of the interest-bearing asset for a future date.

An interest rate swap ("IRS") is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Another common form of IRS, knows as an overnight index swap, exchanges at its termination (or at other intervals, e.g., every three months) a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap.

An interest rate swap futures contract is one in which the underlying instrument is an interest rate swap. As such, an interest rate swap futures contract permits "synthetic" exposure to the underlying interest rate swap, i.e., without entailing actual ownership of the underlying IRS.

In a typical futures trading environment, the standardization of futures contracts and the nature of the central counterparty based trading system allows an exchange, or market participant thereof, to net together offsetting positions in the same contract for the purpose of reducing the margin requirement to reflect the reduced risk of loss of such positions and/or to outright consolidate positions to reduce the size of the portfolio and/or reduce transaction fees therefore. As the exchange, being a central counterparty to all transactions, ensures that each counterparty is not at risk of loss due to the default of the other party, such netting and consolidation by one market participant does not affect the positions and risk undertaken by another participant.

In the case of IRS contracts, however, the variability in the characteristics of positions which may exist in any given portfolio, such as the maturity date, coupon, etc. may make it difficult to identify suitable positions for netting though, for example, such positions, though not identical, may exist which are similar enough as to represent a reduced risk of loss meriting a reduction in the margin requirement. Further complicating this process is the bilateral nature of an IRS contract where a particular position of one party is coupled with a counter position of a counterparty thereto. For instance, an adjustment to improve one party's portfolio may affect the portfolio of the counterparty, in which case adjustments to the counterparty's portfolio may become necessary. Further, as described above, positions in IRS contracts, and in particular, various combinations of positions therein, are typically undertaken to serve particular economic purposes, such as to achieve a particular risk exposure or risk profile, which may be unique to that market participant. Accordingly, IRS contract positions within a particular portfolio may not be consolidated without necessarily affecting not only the economic purpose intended by the market participant holding that portfolio but also the economic purposes which may be different, of any counter party market participants thereto.

When used in coupon blending, the disclosed methods and systems may not include valuing the new trades. The disclosed methods and systems may, in coupon blending and other cases, include a calculation to confirm that the portfolio adjustments are cash flow flat (or within one or more risk constraints). In multilateral compression applications, the new trades are valued exactly as if the parties (e.g., banks) implemented a valuation in their own system. As described below, the decomposition of the existing trades into constituent legs and leg segments (data streams) and the subsequent refactoring of such leg segments into new trades allows the valuation data for the existing trades to be used to value the new trades. In this way, the disclosed methods and systems may verify and report all compression results with constraint outcomes using valuations already approved by the parties.

Although described in connection with examples involving data objects representative of interest rate swap (IRS) trades, the disclosed methods and systems are useful in connection with other types of data objects. For instance, the data objects may be representative of other types of trades or transactions, including, for instance, various types of credit default swap transactions. Still other types of data objects may be processed by the disclosed methods and systems, including, for instance, other data storage or processing systems for which data compression is useful. The types, sources, and other characteristics of the data objects may vary accordingly.

As discussed above, an IRS is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Other types of IRSs exchange other floating rate payments over the timespan of the swap for a fixed rate payment.

Due to the nature of interest rate swap trading, a given portfolio may include a large number of trades, and thus a large number of individually unique positions, also referred to as line items. Each swap trade presents a pay position and a receive position for each party to the trade. A pay position specifies a stream of payment obligations, such as: pay 5% fixed on a notional amount (e.g., $5 million (M)) over a certain time at a particular period pay period. A receive position specifies a stream of incoming payments, such as: receive floating interest rate payments on a notional amount (e.g., $5M) over a certain time at a particular pay period. Each portfolio may include a large number of similar, but not identical, positions. As a result, a new function for clearinghouses to net similar but not identical line items is warranted. The exchange or central counterparty has robust capability to allow a trader to initiate a position (e.g., buy or sell) or unwind the same position (e.g., sell or buy), where unwinding a position may be understood to have an opposing or counter effect as initiating a position. However, the central counterparty has no mechanism to group positions by similar characteristics and then eliminate overlapping line items. In some cases, compression may involve or refer to netting non-identical line items.

Compression generally reduces the notional value of economically offsetting positions without having to necessarily unwind exactly the same position that was initiated. Previous systems have employed compression generally in dealer-to-dealer trading. Given the homogeneity of the user base in existing systems, previously there was little need for systems to accommodate unique compression criteria. However, as the user base for cleared IRS grows, so too do the differences in compression criteria, and the need to pair large numbers of potentially disparate users.

Further, as was described, positions in one portfolio cannot necessarily be netted or consolidated without affecting counter-positions held in the portfolios of the counter-party market participants thereto which may have different criteria for determining nettable/consolidatable positions according to their unique economic purpose. In addition, the exchange or central counterparty may prohibit or inhibit each market participant from being privy to the portfolios and/or criteria of other market participants so as to preserve the anonymity thereof.

While the disclosed embodiments may be discussed in relation to IRS contracts or trades, it will be appreciated that the disclosed embodiments may be applicable to other bilateral contracts, or other multilateral relationships. For instance, the disclosed methods and systems may also be useful in connection with other types of swap trades, including, for instance, those involving cash flows, such as basis swaps, constant maturity swaps, and cross-currency swaps. The disclosed methods and systems may be used in connection with any other market now available or later developed.

In some cases, the procedures provided by the disclosed methods and systems may be initiated and otherwise implemented automatically. For example, the disclosed methods and systems may be configured to automatically process a set of primary data objects and a set of residual data objects upon the detection of a trigger event or condition, such as the number of residual data objects exceeding a threshold. Alternatively or additionally, the disclosed methods and systems may be configured to automatically execute the processing upon completion of a compression procedure.

FIG. 1 depicts a trading network environment for implementing trading systems and methods with credit control in accordance with one example. In this case, an exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, usernames and passwords. An account data module 104 may be provided, which may process account information that may be used during trades and/or credit control, as described below. A match engine module 106 may be included to match bid and offer prices and may be implemented with software that executes algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users.

A risk management module 134 may be included to compute and determine a user's risk utilization in relation to the user's defined risk thresholds. In some cases, the risk management module 134 may be used to implement provide other services, such as compression-related and other data object set processing services, examples of which are described herein, and as will be addressed in connection with the example of FIG. 2.

An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

Any number of the above-described trading system components may be used or otherwise involved in implementation of the data object set processing of the disclosed methods and systems.

The trading network environment shown in FIG. 1 includes example computer devices 114, 116, 118, 120 and 122 which depict different example methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An example computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The example computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the example computer device 114 or a user thereof. The user of the example computer device 114, or the example computer device 114 alone and/or autonomously, may then transmit the trade or other information to the exchange computer system 100.

Example computer devices 116 and 118 are coupled with the local area network ("LAN") 124, which may be configured in one or more of the well-known LAN topologies, e.g. star, daisy chain, etc., and may use a variety of different protocols, such as Ethernet, TCP/IP, etc. The example computer devices 116 and 118 may communicate with each other and with other computer and other devices, which are coupled with the LAN 124. Computer and other devices may be coupled with the LAN 124 via twisted pair wires, coaxial cable, fiber optics or other wired or wireless media. As shown in FIG. 1, an example wireless personal digital assistant device ("PDA") 122, such as a mobile telephone, tablet based computer device, or other wireless device, may communicate with the LAN 124 and/or the Internet 126 via radio waves, such as via WiFi, Bluetooth and/or a cellular telephone based data communications protocol. The PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Example computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers that may maintain a market by providing constant bid and offer prices for a derivative, security, or other financial product to the exchange computer system 100, such as via one of the example computer devices depicted. The exchange computer system 100 may also exchange information with other trade engines, such as trade engine 138.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example computer device 116 may include computer-executable instructions for receiving order information from a user and transmitting that order information to exchange computer system 100. In another example, the example computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

The exchange computer system 100 may be configured to implement the data object set processing of the disclosed embodiments in connection with IRS and/or other trades. In such cases, each trade corresponds with a data object. A set of primary data objects and a set of residual data objects may correspond with one or more portfolios of one or more parties, such as one or more banks. The processing of the set of primary data objects and the set of residual data objects may then follow, include, or otherwise involve compression of the portfolio(s). The compression may be unilateral, and directed solely to the portfolio of a single party, e.g., as in coupon blending. The compression may alternatively be multilateral, when the compression involves the portfolios of multiple parties. Thus, in multilateral cases, the set of primary data objects and the set of residual data objects processed by the disclosed methods and systems includes the portfolios of the multiple parties.

In some embodiments, the compression procedure may involve decomposing each trade (or other data object) in the set into legs (or other constituent data streams) in order to support refactoring, or other re-composition, of segments of the legs (or other streams) into possible new trades (or other data objects). Some of the new trades (or other data objects) may then be incorporated into the data set to provide additional opportunities, or degrees of freedom, to implement the portfolio compression. The new trades (or other data objects) are configured in accordance with the legs (or other streams) of the existing trades (or other data objects) and otherwise configured (e.g., scaled) to implement the portfolio compression.

As a result of the compression procedure, a set of net data objects are generated or otherwise available. Each net data object is unrounded. The net data objects may be representative of net positions or transactions. The net transactions may be specified via one or more properties, including, for instance, start date, end date, fixed position, and float position, all of which have been determined so that the collection of the transactions replicates the original net positions of the accounts, while potentially using less gross notional and a lower number of transactions relative to the original portfolio(s). The float position magnitudes may be specified as a notional magnitude, and the fixed position magnitudes may be specified as a yearly coupon rate. These two magnitudes of a transaction may be referred to as the "notional" and "fixed rate" herein. At this point, these and/or other magnitudes are unrounded. An example is provided and described below in connection with FIGS. 7 and 8.

The compression may be implemented as part of, or otherwise in connection, with the risk management module 134 and/or another module or component of the exchange computer system 100. Other module(s) and/or exchange computer systems may be used to provide the compression service(s). For example, the disclosed embodiments may be implemented by the module(s) and/or exchange computer systems described in U.S. Pat. No. 8,494,953 ("Interest rate swap compression match engine"), U.S. Patent Publication No. 2015/0262305 ("Coupon blending of swap portfolio"), and U.S. application Ser. No. 15/812,573 ("Listed options position compression system"), the entire disclosures of each of which are hereby incorporated by reference and relied upon.

A number of post-compression procedures are then implemented to address the unrounded nature of the net data objects. In some embodiments, the set of unrounded, net data objects is then processed to generate a set of primary data objects and a set of residual data objects. Each pairing of a primary data object and a residual data object is configured to represent one of the net data objects without having to resort to rounding. The primary data object may be selected to be as close as possible to the unrounded data object. For instance, in a financial example, the primary data object may be created by using a rounded version of the unrounded fixed rate as the first fixed rate. The fixed rate of the residual data object may then be chosen so that the residual data object becomes as small as possible. Further details regarding examples of the manner in which the primary and residual data objects are generated are provided below in connection with the example of FIG. 5. In other cases, the sets of primary and residual data objects are accessed or otherwise obtained for processing.

Once the primary and residual data objects have been generated, the significant information, e.g., in each account, portfolio or other dataset, is carried by the primary transactions (or other data objects). The residual data objects do not carry any significant information. In fact, in some compression cases (e.g., risk-free netting compressions), the parties may not be capable of noticing the removal of all of the residual data objects. However, even in such cases, one or more other data integrity rules may be violated or otherwise breached by such global removal. For instance, in financial examples, the cash flow neutrality of the CCP would be breached.

The sets of primary and residual data objects are then processed to reduce the number of residual data objects, while still adhering to the data integrity rule(s). In some cases, some primary data objects, such as those on the order of residual data objects, may also be processed for possible removal. In these ways, the total number of data objects used to represent the results of the compression procedure are also reduced without having to resort to rounding.

Once generated, accessed or otherwise obtained, the residual data objects (and any primary data objects suitable for removal) are collected in a candidate group. As described below, an attempt will be made to remove each data object in the candidate group.

The data objects in the candidate group may be sorted. The sorting may be in order of size, from smallest to largest, in connection with one or more size parameters. In financial examples, the data objects may be sorted by notional size.

A test group is also defined. In some cases, the test group includes all of the primary and residual data objects. More generally, the data objects in the test group are those that are allowed to fluctuate, and thus tested, in an effort to remove the residual data objects.

As described herein, an attempt is made to remove each data object in the candidate group, one by one, e.g., starting with the smallest data object, and then continuing in ascending order. With each attempted removal of a data object, one or more data integrity rules (e.g., daily cash flow neutrality and any other constraints) are analyzed. The rule(s) may be or include constraints from a multi-lateral or other compression, and/or any other type of constraint or other rule. If no data integrity rule is breached by the removal of the data object, the data object is eliminated, and remains eliminated going forward.

If one or more data integrity rules are breached, an attempt to repair or resolve the breach(es) using the data objects in the test group that have not already been removed. An optimization procedure is implemented to determine the manner in which the breach is resolved. In some cases, the optimization uses a local search technique described below. The local search may evaluate a plurality of small steps, or changes, involving the data objects in the test group. In some cases, the evaluation of the small steps is implemented in parallel. The processing may accordingly involve multiple processor cores, threads or other units. The change that has the best cumulative effect toward repairing or removing the breach is determined, and taken. All of the small steps or changes may then be tested again, after which the best change is again found and taken. That process is repeated until the breach is repaired or removed, or until the best change does not improve the current state. In some cases, the optimization may be configured with an iteration limit (e.g., 200) to avoid long runs, which often do not repair the breach.

In some cases, not all of the small steps are evaluated. The effect of certain steps may be indicative of others. For instance, for each change or step, if it is found that a positive effect results (e.g., a positive effect on the penalty calculated by the optimization, as described below), then the opposite change is not evaluated. In one financial example, if increasing the notional of a transaction is having a positive effect, decreasing the notional will have a negative effect. In other words, the effect of adjustments is convex in optimization terms. The adjustments may thus be seen as pairs. Furthermore, if one adjustment is found to have a positive effect, the next change to be evaluated may involve testing to add the adjustment again, e.g., with double magnitude. If that adjustment is having an even better effect, the magnitude is doubled again and applied. This process is repeated until the optimization penalty increases again (which may occur because of convexity in each parameter). The range between the last and the two previous steps is then searched for the optimum change (e.g., the minimum penalty). That final penalty and the associated move may then be used as the total adjustment for that change in the set of possible adjustments.

The evaluation of the effect of a change may address numerical noise and other insignificant effects. For instance, such effects may be disregarded by applying a threshold or other rule in the evaluation. For example, only changes that improve the optimization penalty or other effect parameter by 0.9999*the previous value are deemed an improvement. This threshold and/or other approach may be useful to remove false improvements from noise and cases where small improvements may be seen for large numbers (e.g., hundreds) of iterations, despite not being able to repair or resolve a breach.

The optimization procedure may be configured to efficiently implement the repetition of the testing. For example, in each iteration, the best adjustment is stored in a sorted set, containing a number (e.g., 50) of the latest best adjustments. The set may be configured to have a maximum number (e.g., 50) of the latest best adjustments, but may include less adjustments in accordance with the number of latest best adjustments. If the set has the maximum number, and a new adjustment is found to be the best, the oldest adjustment (e.g., the longest number of iterations back) may be removed from the set.

Alternative or additional sets may be stored for future iterations. For example, a second set of adjustments may include all adjustments that improved the optimization penalty the last time the adjustment was tested.

The second set may be used in combination with the previously described set (the first set) to improve the efficiency and efficacy of the optimization. For example, when attempting to repair a breach, all adjustments may be tested during the first run through the adjustments. After that, only adjustments that improved the penalty the last time are tested (the second set above). All the while, the best adjustments are collected in the first set. After a predetermined number (e.g., 10) of iterations of testing the ones that improved the penalty last time, the first set will have enough entries (e.g., 10 at the most). Any subsequent iterations may then only use the first set.

If the set of best adjustments does not yield an improvement, the algorithm falls back on the second set. If that set does not yield an improvement, then the optimization may proceed to test all of the possible adjustments. If no adjustment yields an improvement, a strategy may be updated, as described below.

Whenever an adjustment is yielding a penalty improvement, a number (e.g., 50) of the best adjustments may be tested during the iteration after that (or the ones yielding an improvement the last time it was tested if iteration count is below 10).

If the attempts at repairing the breach are unsuccessful, any changes made by the optimization (e.g., the local search technique) and the removal of the data object are reverted. If the repair is successful, the changes made by the local search technique are saved and the data object remains eliminated going forward.

This procedure is then repeated until all of the data objects in the candidate group have been attempted to be removed. In some cases, one or more additional passes through the candidate group may be implemented.

As described below, the local search technique may be configured as a neighborhood search or optimization. In each iteration of the procedure, only a very small space, e.g., the neighborhood, around the current state is searched. Then the current state is updated and the neighborhood around that new state is searched. Further details regarding one example of the local search are described below in connection with FIG. 6. In some cases, the first step of the technique involves applying all the neighborhood moves simultaneously to the current state.

In some cases, the data objects in the test group may be pre-processed (e.g., before testing for removal of residual data objects) to repair any breaches of data integrity rules arising from the compression procedure. For example, in multilateral compression examples, small initial breaches of a daily cash flow rule may arise from numerical instabilities in the compression procedure. Any such breaches may be repaired or resolved using the optimization procedure described herein for removal of the residual data objects, and/or another optimization or other procedure.

In the example of FIG. 1, the post-compression processing services provided by the disclosed methods and systems may be implemented as part of, or otherwise in connection, with any one or more of the modules or components of the exchange computer system 100 identified as implementing the compression procedure. Other module(s) and/or exchange computer systems may be used to provide the post-compression service(s) of the disclosed methods and systems, including, for instance, the systems described in the above-referenced patent documents. Alternatively or additionally, the disclosed embodiments may be implemented in connection with another computer system, such as the computer system of a third-party service provider engaged by a market participant for data object set processing, including, for example, a compression vendor. In still other cases, the disclosed embodiments may be implemented by an entity, e.g., a bank, holding or otherwise controlling the portfolio (or set of data objects) to be compressed or otherwise processed.

The disclosed methods and systems, in some embodiments, provide the ability to remove (e.g., automatically remove) data objects from a set of data objects that would otherwise be involved in providing a non-rounded representation of the results of a compression procedure, e.g. coupon blending, which results in a smaller data representation of a swap portfolio, and may also be associated with a lower capital charge for parties (e.g., banks). From a technical perspective, use of the disclosed methods and systems for portfolio compression results in fewer redundant cash flow records and transactions stored, maintained and administered to represent a net portfolio. Reducing the number of records provides the technical benefit of lowering the storage and processing load of the exchange computer system 100 and/or other computer systems involved in the transactions, thereby improving the speed and other performance parameters of such systems. Subsequent processing of the data object set may also be implemented with fewer communications or other data transmissions, thereby lowering network traffic or other network loads.

The post-compression processing of the disclosed methods and systems may be automatically implemented for each account or other dataset involved in a compression. Alternatively, the post-compression processing may be implemented periodically. In some cases, the post-compression processing may be directed to reducing the number of residual data objects for a subset of the accounts involved in the compression. In such cases, the disclosed methods and systems may nonetheless use the data objects of the other accounts involved in the compression to achieve the data object reductions.

Figure 2:
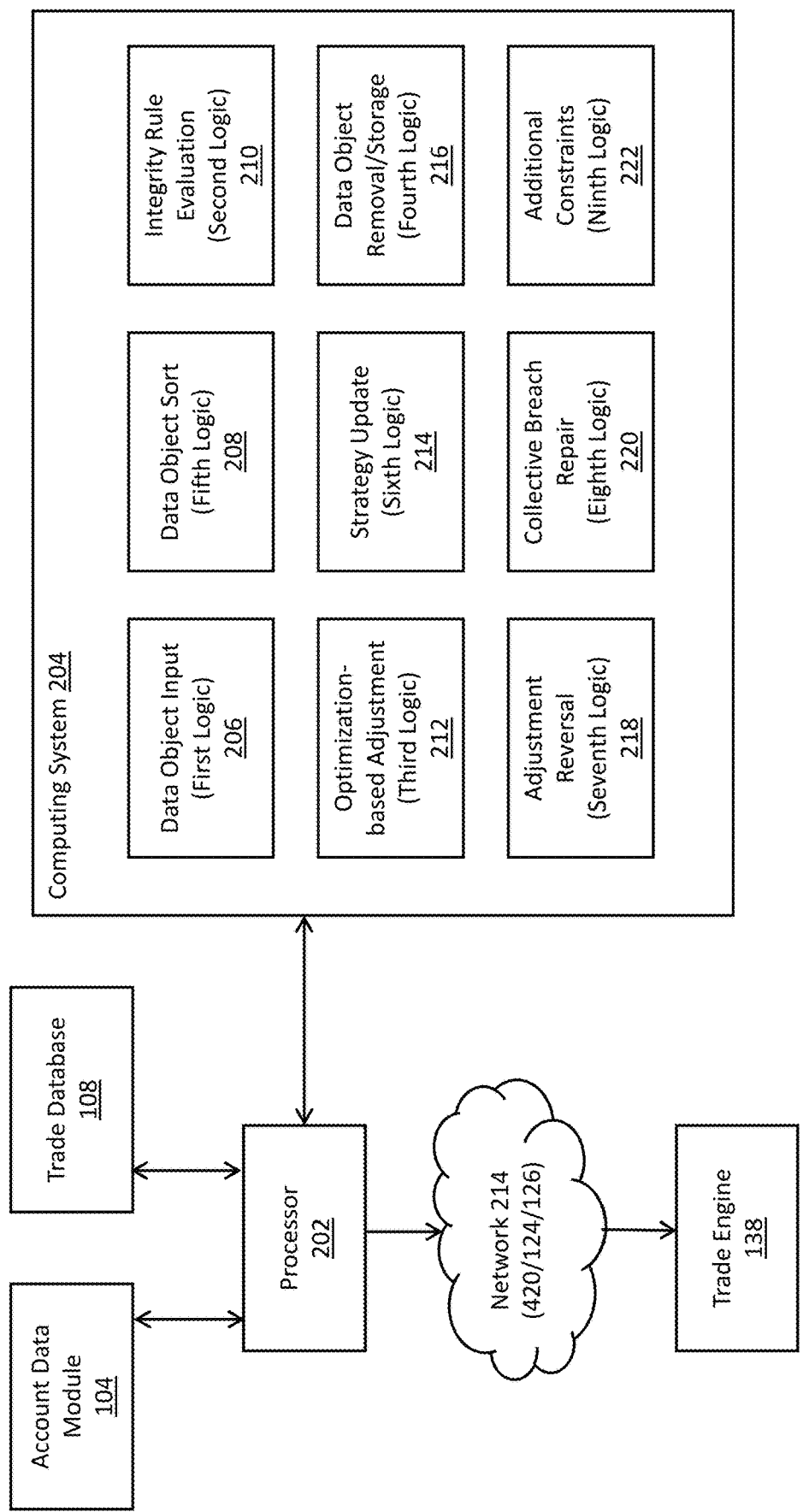
FIG. 2 is a block diagram of a system for processing a set of post-compression, residual data objects in accordance with one example.

FIG. 2 depicts a system 200 for processing a set of data objects. The system 200 may correspond with some or all of the components of the trading environment or exchange computer system described above in connection with FIG. 1. For instance, one or more elements of the system 200 may be or otherwise correspond with the risk management module 134 (FIG. 1). In this case, the system 200 includes a processor 202 and a memory 204 that may be part of the risk management module 134 and/or another module or processor. In some cases, the processor 202 is or includes a customized processor, rather than a general-purpose processor or generic processor. For instance, the customized processor may include one or more hardware components configured to implement one or more aspects of the disclosed methods or systems.

In the example of FIG. 2, the set of data objects processed by the system 200 are representative of IRS or other trades. The processor 202 may accordingly be in communication with the trade database 108 to obtain the set of data objects and effectuate adjustments thereto. Alternatively or additionally, the processor 202 communicates with the account data module 104 and/or the trade engine 138 to obtain and/or adjust the set of data objects. In some cases, such communications to and from the processor 202 may be implemented via the distributed network 214.

The memory 204 is coupled with the processor 202 to provide access to computer-executable instructions stored on the memory 204. The instructions are directed to the data object set processing described herein. In this example, the memory 204 includes eight sets of instructions arranged in respective logic units stored therein. Each logic unit is executable by the processor 202. The number of logic units or instructions sets may vary. For example, the instruction sets may be integrated with one another to any desired extent. Alternative instructions may also be included.

The system 200 includes first logic 206 that, when executed by the processor 202, causes the processor 202 to obtain the set of primary data objects and the set of residual data objects. Each residual data object of the set of residual data objects is associated with, and representative of rounding that led to, a respective primary data object of the set of primary data objects. The data objects may be obtained by accessing a memory or otherwise receiving the data objects.

Obtaining the data objects may alternatively involve generating the data objects from the unrounded, net data objects, and/or generating the net data objects. For instance, in some cases, the first logic 206 is further executable by the processor 202 to cause the processor 202 to implement a compression procedure on an original set of data objects, the compression procedure generating the set of unrounded data objects. The set of primary data objects and the set of residual data objects may then be generated, such that combination (e.g., sum) of each residual data object of the set of residual data objects with the respective primary data object of the set of primary data objects with which the residual data object is associated, reaches one of the set of unrounded data objects.

In the example of FIG. 2, the system 200 includes fifth logic 208 that, when executed by the processor 202, causes the processor 202 to sort the set of residual data objects. As described above, the residual data objects (and any other suitable data objects in the candidate group) may be sorted by a size parameter such that the set of residual data objects are later processed in order of increasing size.

The system 200 includes second logic 210 that, when executed by the processor 202, causes the processor 202 to evaluate, for each residual data object of the set of residual data objects, whether removal of the residual data object breaches a data integrity rule. For instance, the data integrity rule may be, include, or otherwise involve a daily or other cash flow neutrality rule. Any number of constraints or other rules may be evaluated. If no data integrity rule is breached, then the data object is removed, as described below.

The system 200 includes third logic 212 that, when executed by the processor 202, causes the processor 202 to, for each residual data object of the set of residual data objects for which the removal breaches one or more data integrity rules, implement an optimization to attempt to identify at least one adjustment to the set of primary data objects and/or the set of residual data objects, that allows the removal to proceed without breaching the data integrity rule(s). For instance, the adjustment may include an adjustment of a size parameter of at least one data object of the set of primary data objects and the set of residual data objects. The adjustment of the size parameter may be below a predetermined limit. In financial cases, the size parameter may be indicative of a notional amount of a financial data object. Alternatively or additionally, the adjustment includes an adjustment of a rate parameter of at least one data object of the set of primary data objects and the set of residual data objects. The adjustment of the rate parameter may be below a predetermined limit. In financial cases, the rate parameter may be indicative of a fixed interest rate of a financial data object.

The system 200 includes seventh logic 218 that, when executed by the processor 202, causes the processor 202 to reverse the determined adjustment if the breach is not removed after no further improvement is achieved.

The optimization defined by the third logic 212 may cause the processor 202 to, for each residual data object of the set of residual data objects, test a plurality of adjustments to the set of primary data objects and the set of residual data objects. The adjustment that best improves a current state relative to a breach of the data integrity rule is determined and implemented. A current state of the optimization is then updated in accordance with the determined adjustment. Such testing of the plurality of adjustments and determining and implementing the adjustment is then repeated until the breach is removed or no further improvement is achieved.

As described herein, the adjustments may be small adjustments, e.g., within a neighborhood of the data object. Each adjustment may thus fall below a size threshold.

The optimization defined by the third logic 212 may cause the processor 202 to, in connection with determining the adjustment that best improves the current state, calculate a penalty of a new state arising from the adjustment, and determine which adjustment has a lowest penalty. In such cases, the breach may be considered to be repaired when the penalty reaches zero. The optimization may be configured with different strategies, or ways to calculate the penalty. The optimization may also be preconfigured with parameters specifying other limits on the plurality of adjustments, examples of which are described below.

The system 200 includes fourth logic 216 that, when executed by the processor 202, causes the processor 202 to remove, from the set of residual data objects, each residual data object of the set of residual data objects for which the removal does not breach the data integrity rule, and each residual data object of the set of residual data objects for which the at least one adjustment is identified, and to store the at least one adjustment in a memory.

The fourth logic 216 may also cause the processor 202 to store or transmit the changes to the data objects. For instance, the incorporation may involve or otherwise include modifying a spreadsheet or other data structure or record in which the data object set is presented. In financial examples, the storage or transmission of the changes may include or involve execution of one or more trades. In such cases, one or more acts associated with the changes, such as execution of trades, may occur subsequently or separately. Alternatively or additionally, data indicative of the adjustments may be stored in a memory of the exchange computer system 100 (FIG. 1), such as the trade database 108 (FIG. 1). In some cases, such storage may involve or otherwise include storing the modified spreadsheet or other data structure in the memory. Alternatively or additionally, the data indicative of the adjustments may be transmitted to a module of the exchange computer system 100, such as the trade engine 138 (FIG. 1) for execution of one or more trades. In some cases (e.g., when a processor of the exchange computer system is implementing the logic), the fourth logic 216 may cause the processor 202 to execute the one or more trades (e.g., complete the financial transaction(s) associated with the trade).

In the example of FIG. 2, the system 200 includes sixth logic 214 that, when executed by the processor 202, causes the processor 202 to update a search strategy of the optimization. Further details regarding search strategies and the updating thereof are provided below in connection with the example of FIG. 6.

Additional or alternative logic sets may be included. For instance, in the example of FIG. 2, the system 200 may include one or more additional logic units directed to providing further data integrity checks on the results of the residual data object removal processing. For instance, in the example of FIG. 2, the system 200 may further include eighth logic 220 that, when executed by the processor 202, causes the processor 202 to repair any data integrity rules breached via the data objects collectively. Another local search-based optimization may be implemented to that end. Further details are provided below in connection with an example optimization.

The example of FIG. 2 also includes ninth logic 222 that, when executed by the processor 202, causes the processor 202 to minimize effects on any one account or other entity with which certain data objects are associated. The ninth logic 222 may be configured to implement a clean-up procedure in which such account effects are taken into account in another optimization. Further details are provided below in connection with an example optimization.

Further details regarding the functionality provided via execution of the above-described logic units, and by the system 200 more generally, are provided in connection with the examples described below.

Figure 3:
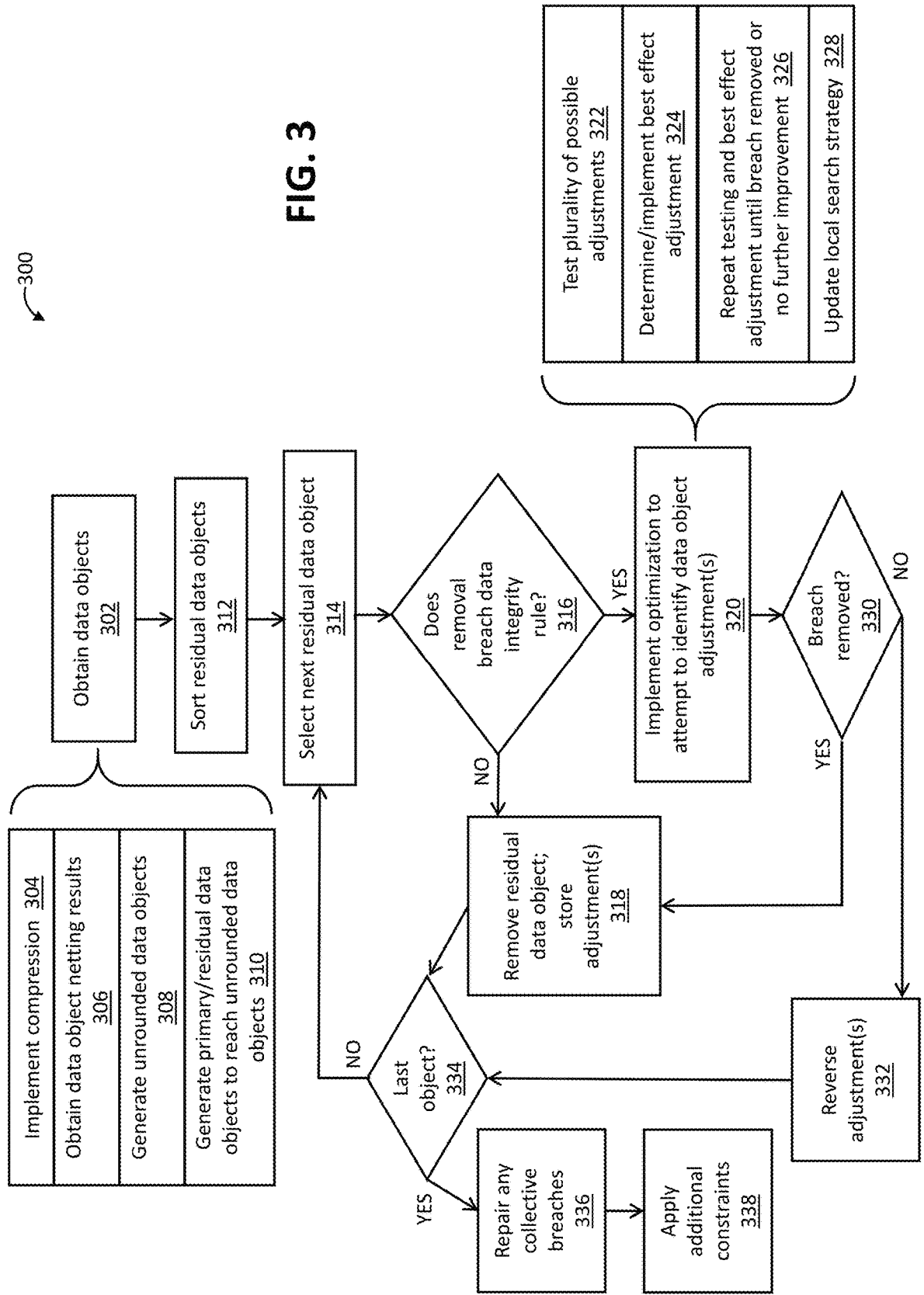
FIG. 3 is a flow diagram of a method for processing a set of post-compression, residual data objects in accordance with one example.

FIG. 3 depicts a computer implemented method 300 for processing a set of data objects. The method 300 may show an example of the operation of the system 200 of FIG. 2, or another system.

Each act of the method 300 is implemented by a processor, such as the processor 202 in the example of FIG. 2, a processor of the exchange computer system 100 in the example of FIG. 1, and/or another processor. The processor may be a processor used to implement a risk management module and/or another management processor. The processor may include any number of processors, such as processing cores or units, and may be disposed in any arrangement.

The method 300 may begin with one or more acts directed to obtaining the primary and residual data objects. In the example of FIG. 3, the method 300 begins with obtaining a set of primary data objects and a set of residual data objects [block 302]. As described above, each residual data object is associated with, and representative of rounding that led to, a respective primary data object. In some cases, a compression procedure may be implemented to generate the data objects [block 304]. In other cases, the results of the compression, e.g., the set of net data objects, may be obtained directly, e.g., by accessing a memory [block 306]. Unrounded data objects may be generated in these and other ways [block 308]. In such cases, the primary and residual data objects may then be generated to reach the unrounded data objects as described herein [block 310].

In the example of FIG. 3, the residual data objects are sorted [block 312]. Other data objects suitable as candidate data objects for possible removal may be included, including, for instance, primary data objects falling below a size threshold. The candidate objects may be sorted in accordance with a size parameter, e.g., in ascending size. The smallest data object may then be selected for processing [block 314].

In a decision block 316, an evaluation of whether removal of the residual data object breaches a data integrity rule is then made. If no data integrity rules are breached, then control passes to a block 318, in which the data object is removed. The removal of the data object may then be stored. Control then may return the block 314, in which the next data object is selected for processing (assuming that the last data object has not yet been reached).

If at least one data integrity rule is breached, then control passes to a block 320 in which an optimization is implemented in an attempt to identify one or more adjustments to the primary data objects and the residual data objects (not yet removed) to repair or remove each breach. The optimization is thus attempting to find the adjustment(s) that would allow the removal to proceed without breaching the data integrity rule.

As described herein, the optimization may be configured to test a plurality of adjustments (e.g., small adjustments) [block 322], determine and implement the adjustment that provides the best effect [block 324], and repeat such testing and best effect adjustments until the breach is removed or no further improvement is achieved [block 326]. The best adjustment may correspond with the one that best improves a current state of the optimization, e.g., relative to the breach of the data integrity rule. Implementing the adjustment may involve updating the current state in accordance with the determined adjustment. As described below in connection with the example of FIG. 6, determining the adjustment that best improves the current state may include calculating a penalty of a new state arising from the adjustment, and determining which adjustment has a lowest penalty. In such cases, the breach may be considered to be repaired when the penalty reaches zero. In some cases, a local search strategy (e.g., the manner in which the penalty is calculated) of the optimization is updated during the testing, as described below in connection with the example of FIG. 6 [block 328].

The small adjustments may be to a size, rate, or other parameter of the data objects, as described herein. For example, the size parameter may be indicative of a notional amount of a financial data object. The rate parameter may be indicative of a fixed interest rate of a financial data object. The nature of the parameter may vary with the type of the data object.

The optimization may be preconfigured with parameters specifying magnitude and/or other limits on the plurality of adjustments. For instance, the magnitudes of the adjustments may be selected to reflect the adjustment sensitivity of the data object and to reflect the magnitudes of the integrity rules. If the integrity rules are very restrictive, small, fine-tuned adjustments may be useful to find a repaired position. If the rules are non-restrictive, larger adjustments may be used to improve the speed of the optimization. In one financial example, in EUR the limit per date is 1 EUR, but in JPY the limit is 200, so in JPY, less precision is involved.

If a data object is sensitive to an adjustment, a small adjustment may have a large impact on the values affecting the integrity rules. Smaller adjustments may thus be useful. In the opposite cases, larger adjustments may be used to improve the speed of the optimization. For example, an inflation swap may have only one cash flow per leg and be 50 years long, so 1 EUR in notional may have a large effect on such cash flows. A trade with 3M cash flows is much less effected per cash flow from a 1 EUR change in notional.

If the breach is removed via the adjustment(s), a decision block 330 passes control to the block 318 for removal of the data object and storage of the adjustment(s). The processing then continues with selection of the next candidate data object (assuming that the last data object has not yet been reached).

If the optimization fails to reach a state in which the breach is removed, control passes to a block 332 in which the adjustments are reversed.

The optimization-based processing of the method 300 may be complete once the last candidate data object has been processed. In the example of FIG. 3, a decision block 334 passes control to a block 336 in which any collective breaches resulting from the optimization results are addressed. Such collective breaches may be addressed via, for example, implementation of another local search optimization procedure. Additional constraints on the optimization results may be imposed in yet another local search optimization [block 338].

The order of the acts or steps of the operation may vary from the example shown. For example, the repair of collective breaches and/or application of additional constraints may be incorporated into the initial optimization that evaluates the removal of each candidate data object.

Additional, fewer, or alternative acts may be implemented. For example, the blocks 336 and 338 may not be included.

Figure 4:
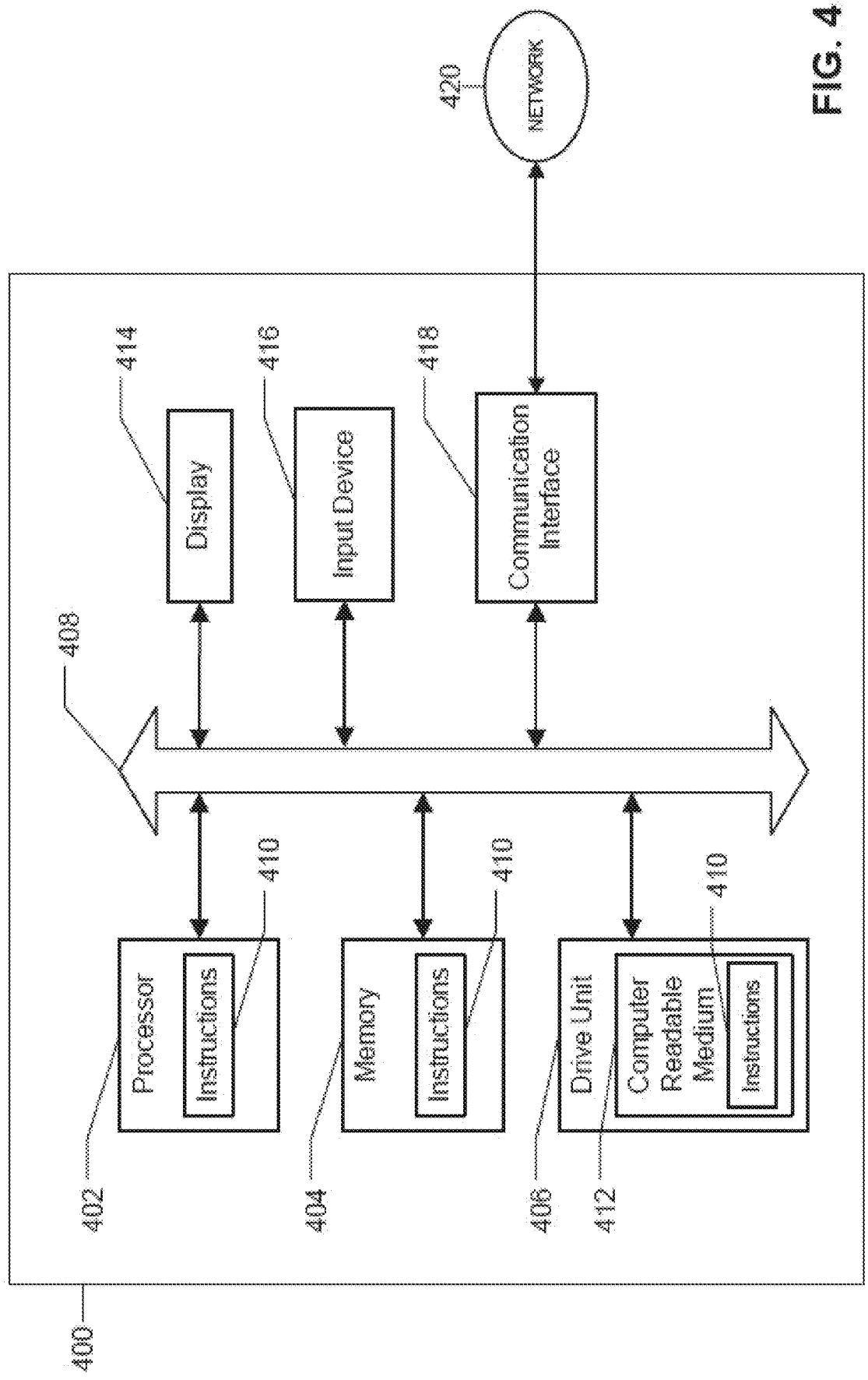
FIG. 4 shows an illustrative embodiment of a general computer system for use in or with the examples of FIGS. 1-3.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate with a drive unit 406 and other components of the system 400 via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 404 is operable to store instructions 410 executable by the processor 402. The functions, acts or tasks illustrated in the figures or described herein may be performed by the programmed processor 402 executing the instructions 410 stored in the memory 404. The instructions 410 may be loaded or accessed from a computer-readable storage medium 412 in the drive unit 406 or other data storage device. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include an optical or other disk drive unit as the drive unit 406. The disk drive unit 406 may include the computer-readable storage medium 412 in which one or more sets of instructions 410, e.g. software, can be embedded. Further, the instructions 410 may embody one or more of the methods or logic as described herein. In a particular embodiment, the instructions 410 may reside completely, or at least partially, within the memory 404 and/or within the processor 402 during execution by the computer system 400. The memory 404 and the processor 402 also may include computer-readable storage media as discussed above.

The present disclosure contemplates a computer-readable medium that includes instructions 410 or receives and executes instructions 410 responsive to a propagated signal, which may be received via a communication interface 418. The system 400 may be connected to a network 420 to communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Figure 5:
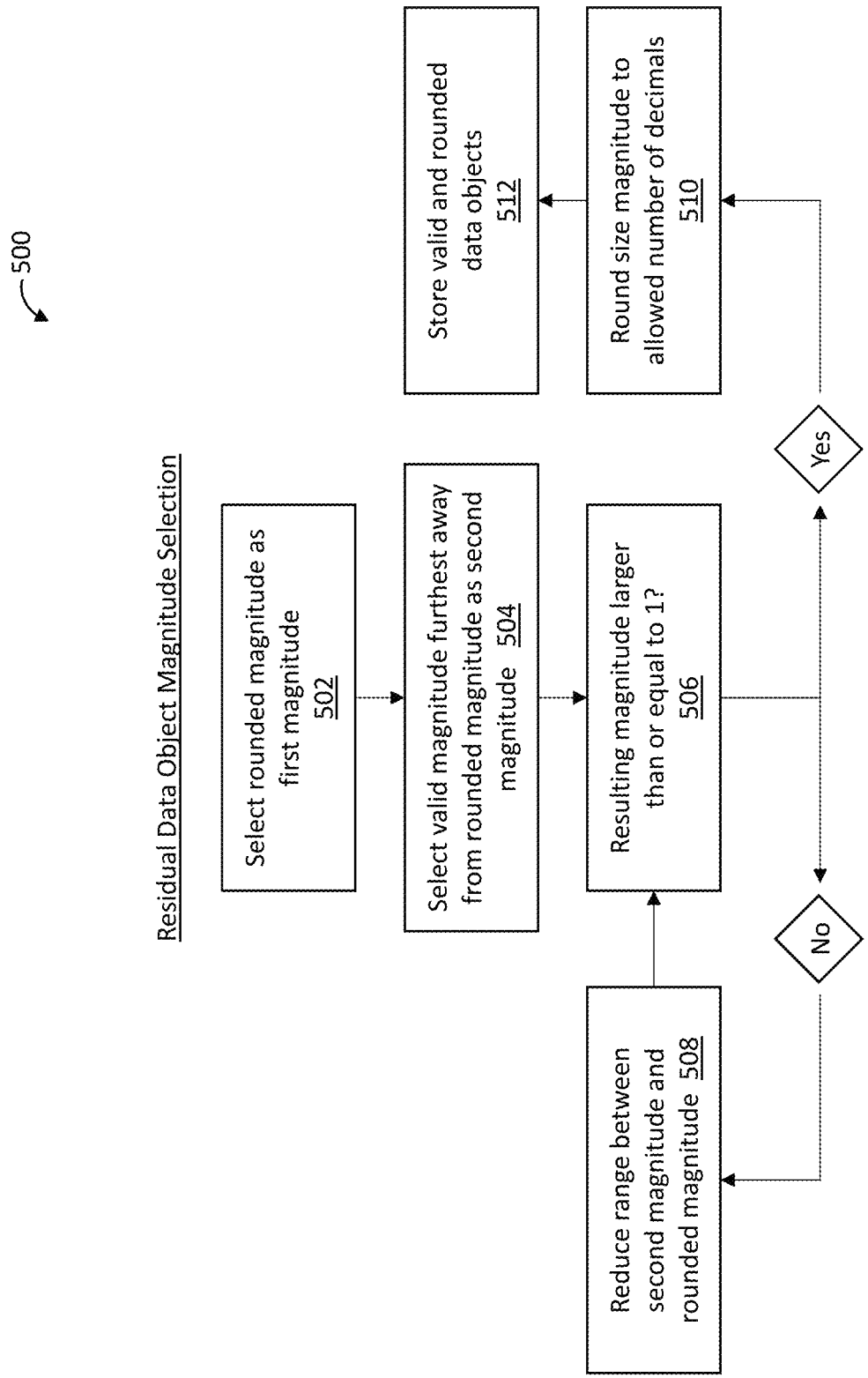
FIG. 5 is a flow diagram of a post-compression method of generating residual objects to be processed in accordance with one example.

FIG. 5 depicts a method 500 directed to the creation of a primary data object and a residual data object from an unrounded data object in accordance with one example. The method 500 may be implemented as part of the method 300 (FIG. 3) in connection with the generation of the primary and residual data objects.

The unrounded data object may correspond with a record created by a compression procedure, but with the fixed rates still unrounded. In some cases, this phase amounts to fixing the notional of the record to the net notional, then the fixed rate can be determined from the definition of yearly coupon (yearly coupon=notional*fixed rate) after that.

Figure 7:
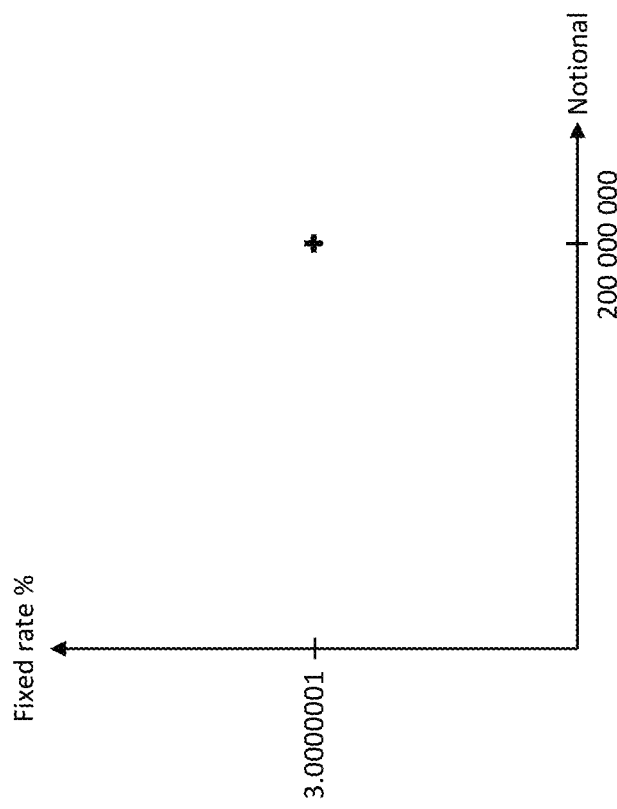
FIG. 7 is a graphical plot of an unrounded, post compression data object in accordance with one example.

An example is shown in FIG. 7, where a net position of a record has been determined to be 200,000,000 in notional and 600,000,020 in yearly coupon. Either the float position or the fixed position may be a negative position in general and the other would have the opposite sign, but for this purpose the signs may be ignored. The notional is thus determined to be 200,000,000 and the fixed rate is then determined as 3.0000001 (fixed rate=yearly coupon/notional=600,000,020/200,000,000).

The CCP or other entity may place restrictions on the minimum and maximum fixed rates that can be used for any given transaction, which in rare cases causes this step to be more complex. When the notional has been determined, and it turns out that the calculated fixed rate is outside of the valid range, two transactions will be needed to create the net position. If the yearly coupon in the previous example is changed to 1,200,000,000 the needed fixed rate would be 6%, and if we assume that the valid range is 1%-5% this situation would occur. To solve this, two transactions are used, and then the rounded fixed rate may be selected from the start to avoid further rounding errors. The procedure to calculate the notional amounts from selected fixed rates may be derived from the following equation $$N_1 + N_2 = N$$

$$N_1 r_1 + N_2 r_2 = YC \quad (1)$$

which may be rearranged to—

$$N_1 = N - N_2 \quad (2)$$

$$N_2 = \frac{YC - Nr_1}{r_2 - r_1}$$

Using $r_2=5\%$ and $r_1=1\%$, $N_2$ is calculated as 250,000,000 and then $N_1$ is determined to be −50,000,000. The gross notional needed to represent this net position is larger than the net float position of 200,000,000. It is thus useful to have as wide a range as allowed and possible between the minimum and the maximum fixed rates when doing any risk-free netting, because it reduces the likelihood for this case to happen. The size of $N_2$ is also divided with the range in equation (2), such that even when a wide range is used, a larger range will result in smaller excess gross notional being used.

The records which now have unrounded fixed rates will be turned into valid records which would be acceptable to use as records of the account portfolio. Most of the records may be unrounded because it may be unlikely that the net fixed rates are outside of the valid range, in which case two rounded fixed rates are used. The first action is to determine if the rounding error for a transaction is significant in relation to the rules of net transaction neutrality stipulated by the CCP, which usually is given as acceptable cash flow amount breaches per pay date and a total acceptable cash flow amount breach. Due to the length of transactions, the sum of rounding errors for consecutive cash flows results in significant rounding errors for most transactions.

Two rounded fixed rates are used to handle the rounding error. The method used to select the fixed rates may vary. One way to select two rounded fixed rates is to use rounded fixed rates which are on either side of the unrounded fixed rate. In the previous example of a float position of 200 000 000 and a yearly coupon of 600 000 020 an intuitive selection could for example be to use 3.1% and 2.9% as the fixed rates and then equation (2) can be used to determine the notional of the two resulting transactions. The resulting rounded transactions have notional amounts of 100000,100 for the 3.1% transaction and thus 99,999,900 for the 2.9% transaction. But this approach creates two transactions that are far from the original unrounded transaction. When looked at individually, the transactions have large absolute values due to the fixed rates that are far from the unrounded fixed rate, and this large sum of absolute values for an account may be undesirable.

FIG. 5 depicts an approach that attempts to create a primary data object (e.g., transaction) as close as possible to the unrounded transaction (or other data object). In this case, the primary data object is created by selecting a rounded version of the unrounded magnitude (e.g., fixed rate) as the magnitude of the primary data object [block 502]. The magnitude (e.g., fixed rate) of the residual data object may then be chosen so that the residual data object becomes as small as possible. Equation (2) again shows that the range between two coupons may be as large as allowed to achieve this. In the example of FIG. 5, a valid magnitude furthest away from the rounded magnitude is selected [block 504].

A block 506 is used to validate that the residual data object has a magnitude (e.g., notional) larger than 1, which may be needed for it to be a valid transaction. If that is not the case, control passes to a block 508, in which the magnitude (e.g., fixed rate) of the residual data object is moved closer to the rounded fixed rate until the notional of the second transaction is larger than or equal to 1.

If the resulting magnitude is acceptable, control passes to a block 510, in which a size magnitude (e.g., notional) of the primary data object is rounded to allowed number of decimals. For example, a CCP may allow two decimals on notional, but banks may not prefer two decimals, so the magnitude is rounded to zero decimals. The valid and rounded data objects are then stored [block 512]. In one financial example, the notional is rounded to a valid number of decimals, and fixed rates as well.

Returning to the example addressed above, if the valid fixed rate range is 1%-5%, the fixed rate of the primary data object may be selected as 3% and the fixed rate of the residual data object as either 1% or 5% because they are of equal distance to 3%. If 1% is selected, application of equation (2) determines that the notional amounts are 200,000,010 and −10. The original, unrounded transaction has now been split into two valid transactions in terms of the fixed rate. The primary transaction may again be seen as the main transaction carrying all the significant information and the residual transaction may be seen as a rounding residual.

The last action is to round the notional of the transaction to the stipulated allowed number of decimals or less. This may not result in any rounding error due to the small impact.

Figure 8:
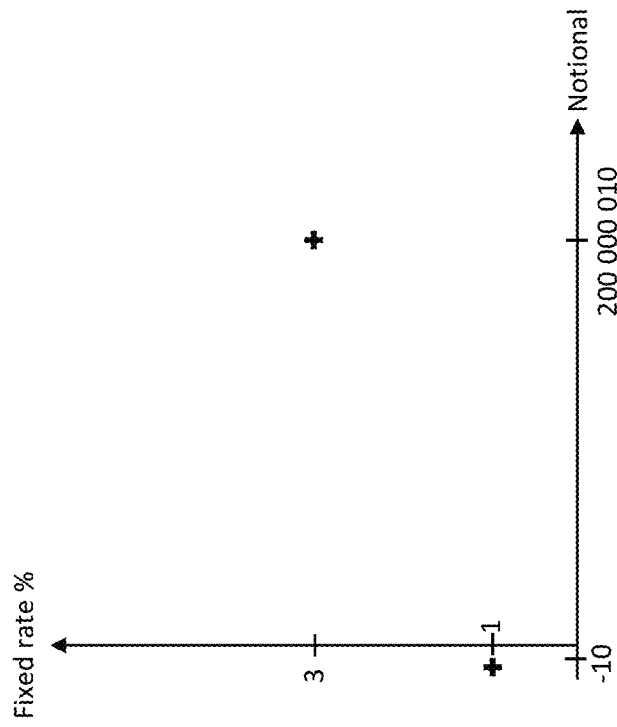
FIG. 8 is a graphical plot of a main data object and a residual data object generated to reach the unrounded data object of FIG. 7.

FIG. 8 illustrates the two resulting transactions, i.e., the primary and residual data objects. The primary transaction has a very similar absolute value to the unrounded transaction, due to the similar fixed rate, and the residual transaction does not carry much, if any, significant information.

Figure 6:
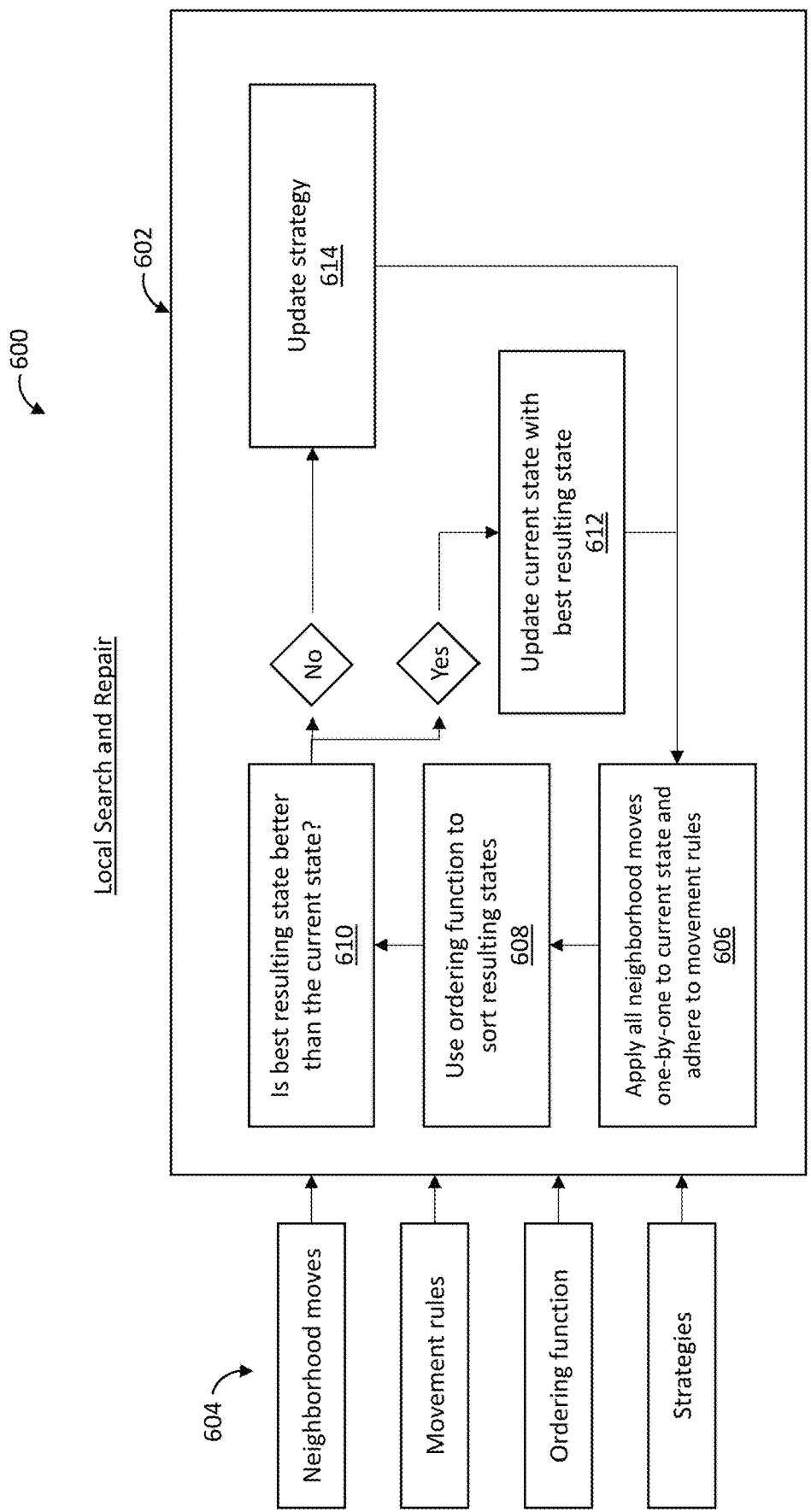
FIG. 6 depicts a flow diagram for an optimization-based adjustment procedure of a method of processing residual data objects in accordance with one example.

FIG. 6 is a schematic depiction of an optimization procedure 600 in accordance with one example. In this case, the optimization 600 includes a local search and repair method 602 configured in accordance with a number of rules, functions, search strategies, and other parameters 604.

As described above, the method 602 of the optimization 600 includes application of a number of neighborhood movements or changes, one-by-one, to the current state of the optimization [block 606]. In this example, each movement or change adheres to one or more movement rules. An ordering function may then be used to sort the resulting states [block 608]. The best resulting state is then evaluated relative to the current state [block 610]. If the best state is better than the current state, then the current state is updated with the best resulting state [block 612]. If not, then a strategy update may be implemented [block 614], and the neighborhood search is repeated.

The method 602 is repeated until either there are no more violations, i.e., that the repair is successful, or there are no more strategies. The repair attempt may then be considered to be unsuccessful.

Further details regarding examples of the method 602 are now provided.

The movement rules may specify which moves within a neighborhood are valid. Thus some of movements may not be applied.

The ordering function is applied to the resulting states from neighborhood moves to identify the best new state. The ordering function may take both cash flow neutrality and any other constraint violations into account. The ordering function may also be used to determine whether the best resulting state is better than the current state.

In financial examples, the neighborhood moves may be small but still significant changes in size to the notional and fixed rate magnitudes of each transaction. This amounts to +/−1 for notional and +/−0.000001% for fixed rate, where valid. In some cases, the changes to the fixed rates may not be allowed.

The movement rules define if a neighborhood move is valid and is applicable for the fixed rate magnitudes. For example, it may not be allowed to create transactions with a fixed rate of zero. There may also be maximum and minimum allowed magnitudes, e.g., such as the valid range described above.

The ordering function may be different depending on which phase the process is in. The ordering function may be defined via several quantities, examples of which are described below.

The ordering function may define a tolerance penalty. For example, the tolerance penalty may include or otherwise involve a sum of constraint breaches.

In some cases, the ordering function may define a penalty as the sum of daily cash flow neutrality breaches and the total cash flow neutrality breach if included, with a scale factor on the cash flow neutrality limit. For example, if the neutrality limit is 1.0, the scale factor is 0.5 and the cash flow impact for one day is 0.75, the penalty contribution for that day is 0.25.

The ordering function may be a function of the number of daily breaches, such as the number of daily cash flow neutrality breaches. A total neutrality breach may also be involved, and be true or false, depending on if the total cash neutrality is breached or not.

These quantities are then used in different constellations and order depending on the strategy.

Examples of strategies to sort and compare states consider the following quantities, listed in the order that the quantities are used for sorting.
  (i) Tolerance penalty; Penalty without total and 1.0 as scale factor;
  (ii) Tolerance penalty; Penalty without total and 0.9 as scale factor; and
  (iii) Tolerance penalty; Number of daily breaches; Penalty without total and 0.9 as scale factor.

In each case, the tolerance penalty may be a sum of breaches on additional constraints or data integrity rules.

For example, a first strategy may first sort by tolerance penalty, then by default data integrity penalty. A second strategy may be similar, but with the second sort element being data integrity with a scale factor.

In some cases, it may be easier to repair a total breach, such as a breach of an allowed change to a sum of all cash flows, relative to a breach on a specific cash flow date for a respective grouping, for example fixed cash flows and float cash flows. The total sum over all types and dates may have a wider limit to it, for example 10 EUR (or USD) instead of 1 EUR per date. There may also be a large amount of transactions or adjustments that influences that sum, so the possibility to find good adjustments may be high. In contrast, for a specific cash flow date, perhaps just a few adjustments may be capable of influencing the sum.

In such cases, the optimization may be configured to disregard the total sum breach when removing residual data objects. The total sum breach may be easy to repair after the other breaches are repaired. This approach underlies the inclusion of "Number of daily breaches" in the strategies. In this way, the optimization does not thwart efforts to repair the daily numbers, while attempting to repair the total.

The optimization may be configured differently when not attempting to remove the residual data objects. For instance, for the optimization directed to collective breaches (e.g., total cash flow neutrality breaches), the strategy to sort and compare states may be configured as follows:
  (i) Tolerance penalty; Number of daily breaches; Total neutrality breach; Penalty with total and 1.0 as scale factor; or
  (ii) Tolerance penalty; Number of daily breaches; Total neutrality breach; Penalty with total and 0.9 as scale factor.

Figure 9:
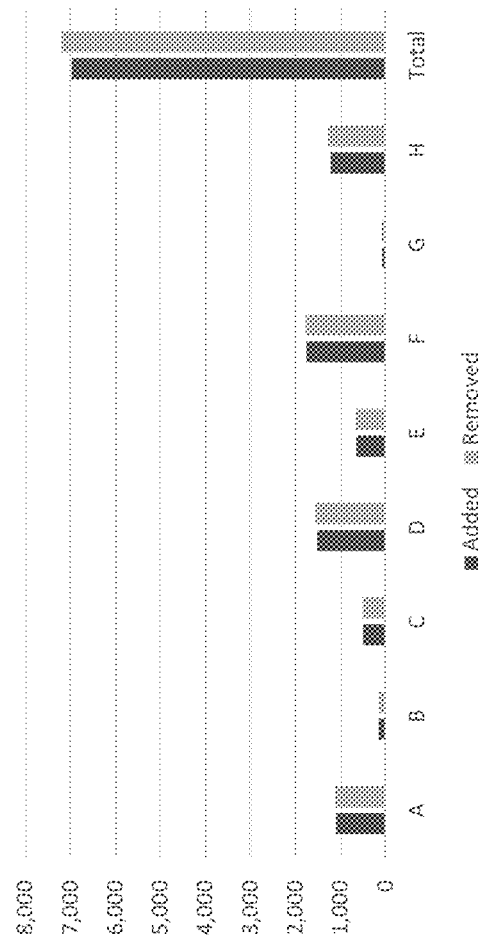
FIGS. 9 and 10 are graphical plots depicting an extent to which residual data objects were removed via implementation of a disclosed method and system in accordance with one example.

The optimization may be configured to incorporate additional constraints in a clean-up procedure implemented after the residual data objects are removed, and any collective breaches are addressed. For example, the optimization may be configured in accordance with a strategy with the following additional constraints:

(i) Penalty with total and 1.0 as scale factor; Tolerance penalty; or
(ii) Penalty with total and 0.9 as scale factor; Tolerance penalty FIG. 9 depicts the number of residual data objects removed in a simulation of the disclosed methods and systems in accordance with one example. In this simulation, accounts A-H are attempting to reach a risk-free netting after a multilateral compression that may or may not have involved additional parties.

For all accounts, the number of eliminated residual data objects is larger than the number added by the multilateral compression. This does not necessarily mean that all residual data objects were removed, because a number of other small transactions may be added for the other parties. In fact, for this simulation, a total of 6,976 residual data objects where added, and 7,195 were eliminated, with 29 removals failing.

Figure 10:

FIG. 10 depicts the fraction of residual data objects removed in the same simulation. The plot shows that more transactions are removed than added to handle the rounding errors. For example, account D alone had about 1,800 transactions removed in this simulation, while avoiding the addition of about 1,500 residual data objects.

The implementation of the above-described methods and systems provides a number of technical benefits, including, for instance, a lower number of data objects (e.g., redundant transactions) to be stored on data storage devices of both parties and the CCP. A lower number of data objects, in turn, leads to, for instance, (i) less computational power consumed or involved to produce transaction data, such as risk or initial margin data for parties and the CCP, (ii) less network bandwidth to send or receive compression results, (iii) less computational power consumed or involved in verifying compression results, (iv) lower fees or other costs in clearing or otherwise processing data objects, such as transactions, added via the compression (e.g., in a multilateral compression), and (v) the elimination of issue of increases in absolute value, or gross mark-to-market, for the parties that would otherwise arise from using two data objects (e.g., coupons) to represent an unrounded data object.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented data compression method including:
    obtaining, by a processor, a plurality of uncompressed data objects; and
    compressing, by the processor, the uncompressed data objects by:
        combining at least subsets of the uncompressed data objects into precision compression data objects;
        generating, by the processor, a reduced-precision primary data object and an associated residual data object for each of the precision compression data objects;
        classifying, by the processor based on one or more data integrity rules, at least a first plurality of the generated residual objects for removal from data storage contingent on application of at least an adjustment to a first one of the generated reduced-precision primary data objects;
        determining, by the processor and for at least a second plurality of the generated residual objects, that removal from data storage violates the one or more data integrity rules;
        applying, by the processor, the adjustment to the first one of the generated reduced-precision primary data objects; and
        removing, by the processor, at least the first plurality of the generated residual objects from data storage.

2. The computer-implemented data compression method of claim 1, wherein the one or more data integrity rules include a flow neutrality constraint.

3. The computer-implemented data compression method of claim 1, wherein the one or more data integrity rules include a constraint that preserves a fixed rate magnitude.

4. The computer-implemented data compression method of claim 1, wherein the first one of the generated reduced-precision primary data objects includes fewer decimal-precision bits than a corresponding precision compression data object.

5. The computer-implemented data compression method of claim 1, further including determining the adjustment to the first one of the generated reduced-precision primary data objects by performing a local search using a minimization of a penalty parameter among a set of candidate adjustments.

6. The computer-implemented data compression method of claim 5, wherein the penalty parameter is based on:
    a change to a notional magnitude;
    a change to a rate magnitude; and/or
    a change to a flow magnitude.

7. The computer-implemented data compression method of claim 5, wherein performing the local search includes applying a clean-up procedure by accounting for an account effect from a previously applied adjustment.

8. The computer-implemented data compression method of claim 5, wherein performing the local search includes sorting the generated residual objects into a particular order.

9. The computer-implemented data compression method of claim 8, wherein sorting the generated residual objects into the particular order includes ordering the generated residual objects based on a size parameter.

10. The computer-implemented data compression method of claim 1, wherein applying the adjustment to the first one of the generated reduced-precision primary data objects includes applying a risk-free netting operation to the generated reduced-precision primary data objects and the generated residual objects.

11. Non-transitory computer-readable media configured to storage instructions thereon, the instructions configured to, when executed, cause a processor to:
  obtain a plurality of uncompressed data objects; and
  compress the uncompressed data objects by:
    combine at least subsets of the uncompressed data objects into precision compression data objects;
    generate a reduced-precision primary data object and an associated residual data object for each of the precision compression data objects;
    classify, based on one or more data integrity rules, at least a first plurality of the generated residual objects for removal from data storage contingent on application of at least an adjustment to a first one of the generated reduced-precision primary data objects;
    determine, for at least a second plurality of the generated residual objects, that removal from data storage violates the one or more data integrity rules;
    apply the adjustment to the first one of the generated reduced-precision primary data objects; and
    remove at least the first plurality of the generated residual objects from data storage.

12. The non-transitory computer-readable media of claim 11, wherein the one or more data integrity rules include a flow neutrality constraint.

13. The non-transitory computer-readable media of claim 11, wherein the one or more data integrity rules include a constraint that preserves a fixed rate magnitude.

14. The non-transitory computer-readable media of claim 11, wherein the first one of the generated reduced-precision primary data object includes fewer decimal-precision bits than a corresponding precision compression data object.

15. The non-transitory computer-readable media of claim 11, wherein the instructions are further configured to cause the processor to determine the adjustment to the first one of the generated reduced-precision primary data objects by performing a local search using a minimization of a penalty parameter among a set of candidate adjustments.

16. The non-transitory computer-readable media of claim 15, wherein the penalty parameter is based on:
  a change to a notional magnitude;
  a change to a rate magnitude; and/or
  a change to a flow magnitude.

17. The non-transitory computer-readable media of claim 15, wherein the instructions are configured to cause the processor to perform the local search by applying a clean-up procedure by accounting for an account effect from a previously applied adjustment.

18. The non-transitory computer-readable media of claim 15, wherein the instructions are configured to cause the processor to perform the local search by sorting the generated residual objects into a particular order.

19. The non-transitory computer-readable media of claim 18, wherein the instructions are configured to cause the processor to sort the generated residual objects into the particular order by ordering the generated residual objects based on a size parameter.

20. A data compression system including:
  means for obtaining a plurality of uncompressed data objects; and
  means for compressing the uncompressed data objects including:
    means for generating a reduced-precision primary data object and an associated residual data object for each of the precision compression data objects;
    means for combining at least subsets of the uncompressed data objects into precision compression data objects;
    means for classifying, based on one or more data integrity rules, at least a first plurality of the generated residual objects for removal from data storage contingent on application of at least an adjustment to a first one of the generated reduced-precision primary data objects;
    means for determining, for at least a second plurality of the generated residual objects, that removal from data storage violates the one or more data integrity rules;
    means for applying the adjustment to the first one of the generated reduced-precision primary data objects; and
    means for removing at least the first plurality of the generated residual objects from data storage.

* * * * *